United States Patent
Ashton et al.

(10) Patent No.: US 8,985,927 B2
(45) Date of Patent: Mar. 24, 2015

(54) INSULATION HANGER STRIPS AND SAFETY STACK PACKAGING THEREFOR

(75) Inventors: David Fleet Ashton, Riverside, RI (US); Louis Steven Costa, Bristol, RI (US); Christopher Allan Ryding, Taunton, MA (US); Anthony David Oliver, Riverside, RI (US)

(73) Assignee: Gripnail Corporation, East Providence, RI (US)

( * ) Notice: Subject to any disclaimer, the term of this patent is extended or adjusted under 35 U.S.C. 154(b) by 280 days.

(21) Appl. No.: 13/554,112

(22) Filed: Jul. 20, 2012

(65) Prior Publication Data

US 2013/0022425 A1      Jan. 24, 2013

Related U.S. Application Data

(60) Provisional application No. 61/510,638, filed on Jul. 22, 2011, provisional application No. 61/510,649, filed on Jul. 22, 2011.

(51) Int. Cl.
  *F16B 15/08*      (2006.01)
  *F16B 15/00*      (2006.01)

(52) U.S. Cl.
  CPC .............. *F16B 15/0053* (2013.01); *F16B 15/08* (2013.01)
  USPC ............................ 411/444; 206/346; 411/442

(58) Field of Classification Search
  USPC ......... 411/480, 923, 82.2, 442–447; 206/343, 206/346, 347; 52/506.05
  IPC .............................................. F16B 15/08,27/00
  See application file for complete search history.

(56) References Cited

U.S. PATENT DOCUMENTS

| | | |
|---|---|---|
| 294,111 A | 2/1884 | Brock |
| 336,539 A | 2/1886 | Woodward et al. |
| 343,689 A | 6/1886 | Barrett |
| 422,198 A | 2/1890 | Forster |
| 887,532 A | 5/1908 | Sherman |
| 1,046,665 A | 12/1912 | Smith |
| 1,782,695 A | 11/1930 | Prez |
| 2,242,967 A | 5/1941 | Carlile |

(Continued)

FOREIGN PATENT DOCUMENTS

JP      6171683      6/1994

OTHER PUBLICATIONS

Guide to Insulation Fastening. (online). Midwest Fasteners. Inc. Jun. 2007. (retrieved on Oct. 16, 2012). Retrieved from the Internet: <URL: http://www.midwestfasteners.com/menudownloads/1317%20NEW%20Version.pd> pp. 9-11.

*Primary Examiner* — Gary Estremsky
(74) *Attorney, Agent, or Firm* — Breiner & Breiner, L.L.C.

(57) ABSTRACT

Hanger strips for securing insulation material to a surface of a structure formed of sheet metal material including a plurality of bases which are connected by one or more breakable tabs integrally formed between each pair of adjacent bases and wherein first open slots extend from each of the breakable tabs toward opposite side edges of the bases and wherein a shank extends from each of the bases in a common direction and wherein pluralities of strips are oriented in first and second assemblies of rows of strips having their shanks opposing one another and their bases overlapping one another such that tips of the shanks are safely enclosed between the bases of the opposing assemblies and seated within the first open slots.

18 Claims, 7 Drawing Sheets

(56) References Cited

U.S. PATENT DOCUMENTS

| | | | | |
|---|---|---|---|---|
| 2,365,629 | A | 12/1944 | Eckel | |
| 2,427,392 | A | 9/1947 | Eckel | |
| 2,574,219 | A | 11/1951 | Marsden | |
| 2,590,358 | A | 3/1952 | Williams | |
| 2,793,887 | A | 5/1957 | Moore | |
| 2,859,685 | A | 11/1958 | Alexander | |
| 3,057,472 | A | 10/1962 | Douty | |
| 3,088,361 | A * | 5/1963 | Hallock | 411/372.5 |
| 3,165,968 | A | 1/1965 | Anstett | |
| 3,246,439 | A | 4/1966 | Foster, Jr. et al. | |
| 3,374,883 | A | 3/1968 | Powers | |
| 3,478,872 | A | 11/1969 | Becht | |
| 3,963,452 | A | 6/1976 | Jureit et al. | |
| 4,040,325 | A | 8/1977 | Monacelli | |
| 4,220,070 | A | 9/1980 | Anstett | |
| 4,320,605 | A | 3/1982 | Carlson et al. | |
| 4,458,387 | A | 7/1984 | Pearson | |
| 4,541,211 | A | 9/1985 | Garrett | |
| 4,712,676 | A | 12/1987 | Randall | |
| 4,724,638 | A * | 2/1988 | Bezborodko | 52/506.05 |
| 4,932,187 | A | 6/1990 | Kraemer et al. | |
| 4,934,026 | A | 6/1990 | McNerney | |
| 5,142,839 | A | 9/1992 | Kraemer | |
| 5,325,964 | A * | 7/1994 | Lyons | 206/345 |
| 6,722,497 | B2 * | 4/2004 | Pally et al. | 206/347 |
| 8,033,394 | B2 * | 10/2011 | Nakagawa et al. | 206/343 |
| 2004/0206647 | A1 | 10/2004 | Skelton | |
| 2005/0230278 | A1 | 10/2005 | Vogrig et al. | |
| 2010/0176179 | A1 | 7/2010 | Aoki | |

\* cited by examiner

INSULATION HANGER STRIPS AND SAFETY STACK PACKAGING THEREFOR

CROSS REFERENCE TO RELATED APPLICATIONS

This application claims the benefit of U.S. Provisional Patent Applications Ser. Nos. 61/510,638 and 61/510,649, both filed on Jul. 22, 2011, in the name of the same inventors. The content of the applications are incorporated in their entirety by reference.

FIELD OF THE INVENTION

The present invention relates to insulation hangers or fasteners of the type that are mounted to surfaces that are to be insulated by being wrapped or covered by different types of insulating materials. The hangers have bases from which extend outwardly oriented shanks that are used to secure such materials to underlying substrates including but not limited to metal air and fluid ducts, metal and cementitious walls, ceilings of metal buildings and other building structures, airconditioners, chillers, coolers, water heaters, boilers, furnaces, heaters and other mechanical structures and the like. More particularly, the invention is directed to a method of manufacturing such hangers in strips so as to both facilitate handling of the hangers during use and to also enable strips of hangers to be assembled in a stacked and facing relationship with one another so as to provide safer shipping and handling of packaged hangers to prevent injury to workers during packaging, shipping, storing, handling and installation.

BRIEF DESCRIPTION OF THE RELATED ART

There are numerous types of metal hangers or fasteners, hereinafter, "hangers" that are used to secure materials such as insulation batting or paneling to support surfaces. Such fasteners are exemplified by hangers sold and distributed by AGM Industries, Inc. of Brockton, Mass., US, Midwest Fasteners, Inc, of Miamisburg, Oh., US, Gemco, of Danville, Ill., US, ACS Stainless Steel Fixings Ltd, of Leeds, GB, and Duro Dyne Canada Inc., of Lachine, Quebec, Calif. With reference to FIGS. 1-3 of the Drawings, such hangers are formed of metal having an enlarged generally flat base from which pointed shanks extend. There are generally two types of such hangers with one hanger 20A, shown in FIG. 1, having a perforated base 21A having a plurality of spaced holes 22 therein through which a thick industrial type adhesive applied to surface to be covered by an insulating material flows when the base is applied against the surface. Extending outward of the base is a pointed "nail-like" shank 23A.

The second type of hanger 20B is shown in FIG. 2 and includes an imperforate sheet metal base 21B having a peel and stick feature including a double side adhesive tape or material 24 covering the outer portion of the base which, prior to use, is covered by a removable release paper or other strip 25. In the use of the peel and stick hangers 20B, a worker removes the release paper or strip 25 and places the adhesively covered base 21B against a surface to which an insulating material is to be secured. A "nail-like" shank 23B extends outwardly from the opposite side of the base 21B from the adhesive 24.

The diameter "D" of the shanks 23A and 23B may vary with the ones shown in the Figures being approximately one-eighth of an inch. The length "L" of the shanks may vary between approximately one-half to six or more inches depending upon the thickness of an insulation to be anchored to a support surface by being impaled over the shanks.

In use of these conventional hangers, after the hangers are adhered to a surface, an insulation material is impaled over the shanks. Tinnerman-type self-locking metal washers or clips 26, see FIG. 3, are used to prevent removal of the insulation material from the shanks. Such clips are available from the same manufacturers and distributors set forth above. The clip 26 shown has a rectangular body 27 having a central hole 28 of a diameter that is slightly less than the diameter "D" of the shanks 23A and 23B. A plurality of slits 29 are made in the body and radiate outward from the hole 28. The portion 30 of the body having the slits may be of concave circular shape as viewed from the bottom of the clip as shown in FIG. 3. The clip may also have outer reinforced bent ribs 32 formed beyond the portion 30 to prevent the edges of the clip from being easily deformed and to prevent the surface of the insulation from being torn. It should be noted that other configurations of locking clips or washers may be used such as clips having round bodies reinforced by one or more annular ribs or clips have domed covers that serve to cover exposed ends of the shanks that extend through the body of the clip in use. Other locking clip configurations such as oval, hexagonal and the like may also be used. After an insulation material is impaled over the shanks, the clips 26 are pushed over the tips of the shanks and automatically lock in place thereby preventing the removal of the insulation material.

The tips of the hanger shanks are sharp and, if the hangers are not properly handled, can easily penetrate an individuals skin. As described, the size or lengths of the shanks can vary from less that one half inch to six inches or more depending on the insulation material being fastened. Conventionally, after manufacture, the hangers 20A and 20B are randomly packaged in corrugated cardboard boxes for distribution. During shipment and after being handled, the pointed shanks of the freely packaged hangers often penetrate through the cardboard packaging making the boxes difficult and dangerous to handle. In addition, workers can be injured by simply reaching into an open box of the hangers by accidentally grasping the sharp edges or corners of the bases of the hangers or by being stuck by the sharp points of the hanger shanks. To avoid such work site injuries, many workers will wear protective gloves, however, using protective gloves makes the removal of the release papers associated with the 20B type hangers very difficult.

In view of the foregoing, there is a need to manufacture, package and distribute insulation hangers in a manner which makes the use of the hangers safer during distribution and handling of packaged boxes and during removal of the hangers from the boxes.

SUMMARY OF THE INVENTION

The present invention is directed to insulation type hangers that are manufactured, packaged and distributed in strips whereby a plurality of hangers are formed from an elongated sheet of metal which forms the bases of a plurality of hangers that are integrally joined to one another at areas of weakness, such that by bending one hanger relative to an adjacent hanger along the strip of metal, a single hanger breaks free of the other hangers of the strip. In this manner there is less likelihood of someone being injured by being cut or impaled by portions of individual hangers that are randomly, and not orderly, stored in boxes, as is the case with currently manufactured and distributed hangers.

During manufacture, a plurality of hanger bases are integrally formed by cutting, stamping or punching metal strips and thereafter driving a plurality of spaced shanks through the joined bases. Thereafter, the strips are packaged by placing strips in opposing relationship with one another such that the pointed ends of the shanks of one strip are oriented toward the bases of the opposing strip and subsequently placing the opposing strips in stacked relationship within a corrugated cardboard box or shipping container. In this manner, the sharp points of the shanks are prevented from piercing through the cardboard material as the points can not pierce through the metal of the opposing bases of the opposing strip of hangers.

In a preferred embodiment, open slits are made in opposing relationship extending inwardly from opposite edges of the strips which slits not only define edge portions of the joined heads but which also permit a plurality of strips having shanks oriented in the same direction to be slidably stacked relative to one another in a front to rear manner with the shanks of a plurality of strips seated within the slits of other strips that are stacked relative to one another. In this manner a plurality of first strips of hangers having the shanks extending in a first direction and mounted in close relationship to one another may be packaged in opposing relationship to a plurality of second strips mounted in close relationship, thereby increasing the number of hangers that can be packaged within a given volume of a container or box. In addition, due to the orderly configuration of the packaged hangers, the possibility of an accidental injury by being cut or stabbed by the hangers is significantly reduced.

It is a primary object of the present invention to provide strips of insulation type hangers in such a manner as to facilitate the handling of the hangers especially when removing fasteners from shipping boxes and for permitting a plurality of hangers to be handled at one time by an insulation installer.

It is another object of the invention to make the handling and shipping of boxes or containers of insulation hangers safer by packaging the hangers in orderly strips of integrally attached hangers which are stacked in facing relationship with one another such that the shanks of strips oriented in a first direction are opposed to the bases of strips having shanks oriented in a second direction, opposite the first, such that the pointed tips of the shanks are prevented from piercing walls of a shipping container or box by engaging the bases of oppositely oriented strips of hangers when the stacked strips are placed within shipping boxes or containers.

BRIEF DESCRIPTION OF THE DRAWINGS

A better understanding of the invention will be had with reference to the accompanying drawings wherein.

DESCRIPTION OF THE PREFERRED EMBODIMENT

Figure 1:
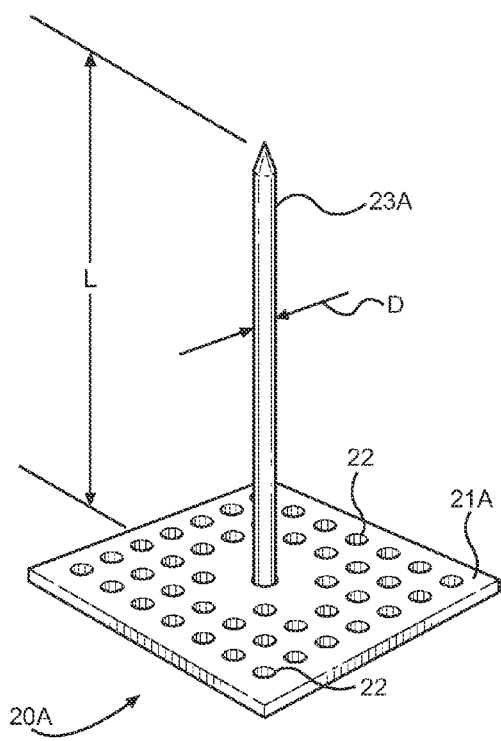
FIG. 1 is a top perspective view of one conventional form of insulation fastener.

With continued reference to FIGS. 4-18 of the drawings, the present invention makes the handling and use of insulating hangers safer and more efficient. Each of the hangers 40 of the invention have generally flat bases 42 formed from a common or integral sheet metal material 43 which is preferably an aluminum or galvanized or stainless steel sheet. The bases 42 are shown as being somewhat square in configuration although other shapes including round, rectangular, hexagonal or otherwise may be used. The dimensions of the bases may vary, such as from approximately an inch to three or more inches along each edge or in diameter. The material is cut, such as by stamping or punching, so that each base is connected to an adjacent base by one or more integral tabs 44. The dimension or configuration of the tabs is such that the individual hangers may be severed from a strip 45 of hangers by flexing a hanger about an adjacent tab, as shown by the arrow "A" in FIG. 4, until the tab breaks. As shown in the drawings, two spaced tabs 44 are used in the preferred embodiment in order to provide sufficient strength to permit the strips 45 to be easily handled without premature severing or breaking of the tabs. In this manner, insulation installers can easily and safely grasp and manipulate the strips 45 of hangers. As the hangers are formed in integral strips, installers may remove a plurality of hangers at one time from a distribution or shipping box, as will be described herein, without the likelihood of becoming accidental stabbed by a shank 46 of one of the hangers or cut by an edge or corner of one of the bases of the hangers.

Although not shown in the drawings, the heads 42 of the hangers may be stamped to provide indentations or ribs therein that function to reinforce the heads making bending of the heads more difficult.

Figure 4:
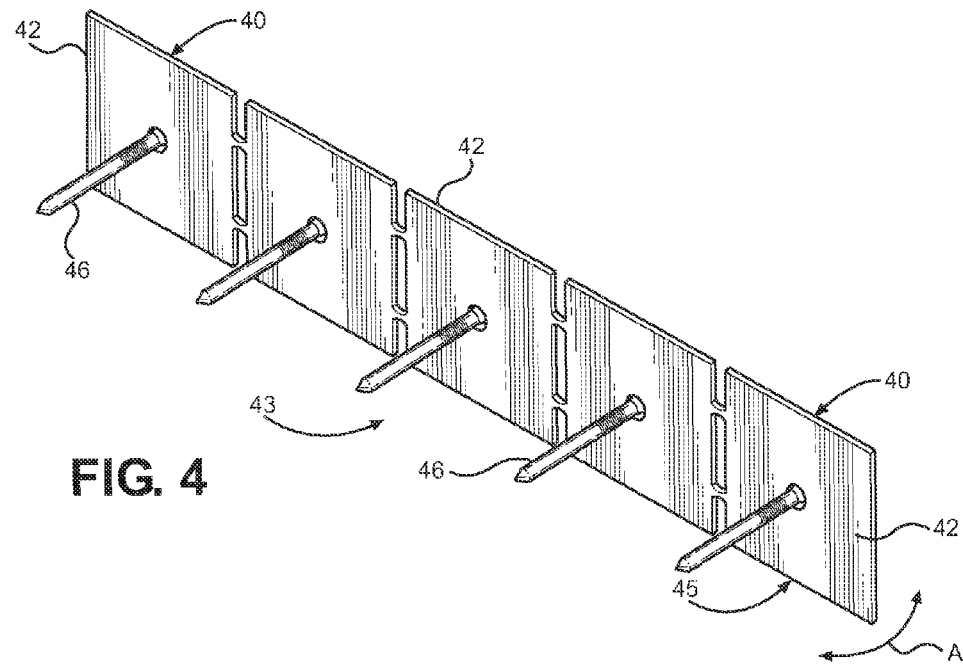
FIG. 4 is a top perspective view of a strip of insulation hangers having bases joined in edge to edge relationship by integrally formed breakable connecting tabs.
Figure 5:
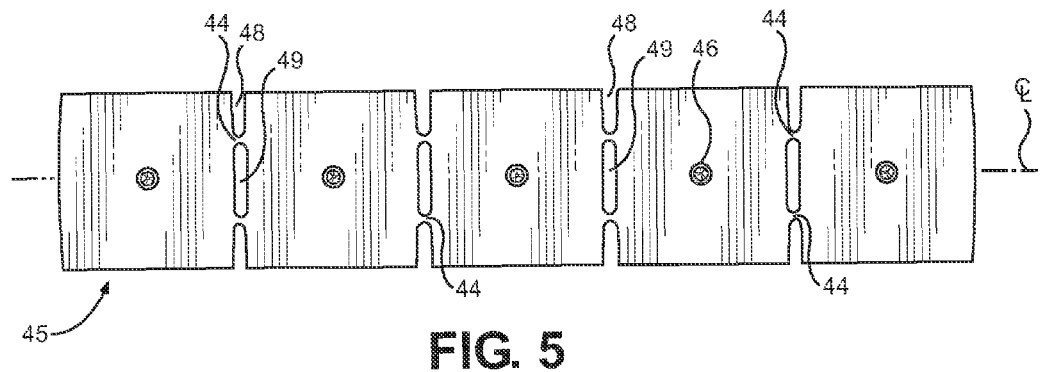
FIG. 5 is top plan view of the strip of hangers shown in FIG. 4.
Figure 6:
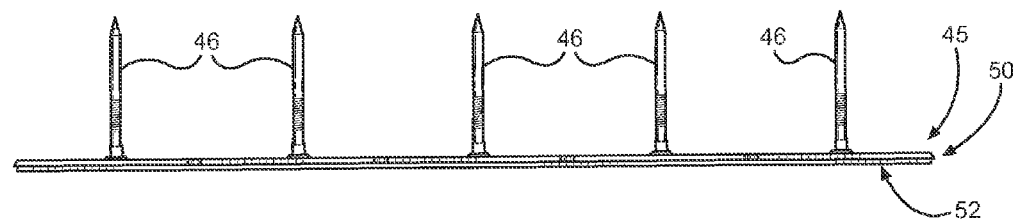
FIG. 6 is a side view of the strip of hangers shown in FIG. 4.

As shown in FIGS. 4 and 5, open slots 48 extend inwardly from opposite edges of the sheet material 43. The bottom portion of each of the slots is preferably of a size to receive a shank of another hanger therein when the strips 45 are placed in back to front assemblies as will be described hereinafter. The tabs 44 are thus created generally centrally between the outer edges of strips 45 and a centerline "CL" thereof. Also, as the sheet material is being stamped, another open slot 49 is formed between the two tabs 44.

Although not shown in the drawings, as opposed to having the open slots 49 intermediate the tabs 44, the tabs may be formed closer to one another, or use only a single tab between each base and have the slots 48 extend closer to one another. In addition, it may be desirable to form slots in one or both opposite sides of each of the bases, which slots may be used to receive shanks extending from other strips of hangers when the strips of hangers are assembled for packaging and shipment as will be discussed in more detail herein.

Although the strips 45 of hangers 40 shown in the drawings show five (5) hangers in each strip, the number may be increased or slightly decreased, although increasing the number makes handling of the strips more difficult as the strips may have a tendency to bend while decreasing the number reduces the effective handling and packaging of the strips 45.

After the sheet metal material 43 is formed, the shanks 46 are driven through the center portion of each of the bases 42 and they may be locked in place by mechanical crimping or spot welds, not shown, to the bases 42. In the preferred embodiment of the invention, the hangers 40 are structured to be similar to the peel and stick type fasteners 20B of the prior art and, in this respect, the heads 42 opposite the shanks are coated with an adhesive having a peel away tape placed thereon or are covered by double sided adhesive tapes 50 that are applied to each of the bases of each strip 45. The tapes 50 are covered by removable covering tapes 52 which are peeled away by an installer in order to allow the hangers to be adhered to a surface to be covered by an insulation material. The tapes 50 and 52 are shown somewhat in exaggerated size in FIG. 6 as the tapes are quite thin layers of material.

The dimensions of the resulting hangers 40 are similar to those of the prior art with the heads being from one to several inches or more along each edge or in diameter. The diameter of the shanks 46 may vary with the ones in the drawings being approximately one-eighth of an inch. The length of the shanks may vary between approximately one-half to six or more inches depending upon the thickness of the insulation to be anchored to a support surface by being impaled over the shanks.

In use of the strips 45, an installer grasps a strip from a box and with a simple bending motion of the strip, see the motion arrow "A" in FIG. 4, severs each hanger 40 in sequence from the strip. The installer then peels the covering tape 52 from the base of the hanger and the adhesive portion of the base of the hanger is pressed against the surface to be covered with an insulation material.

Figure 3:
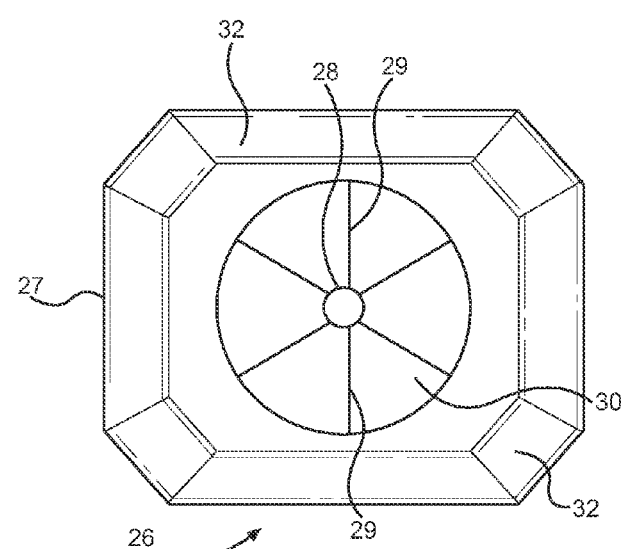
FIG. 3 is a bottom view of a locking clip for use with the hangers of FIG. 1 and FIG. 2.
Figure 2:
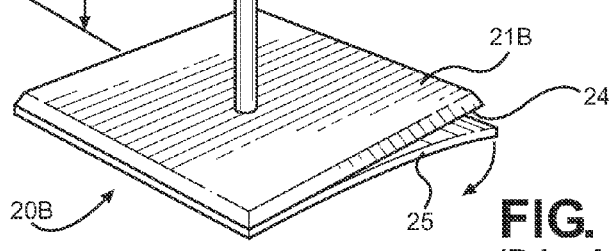
FIG. 2 is a top perspective view of a second form of conventional insulation hanger.
Figure 16:
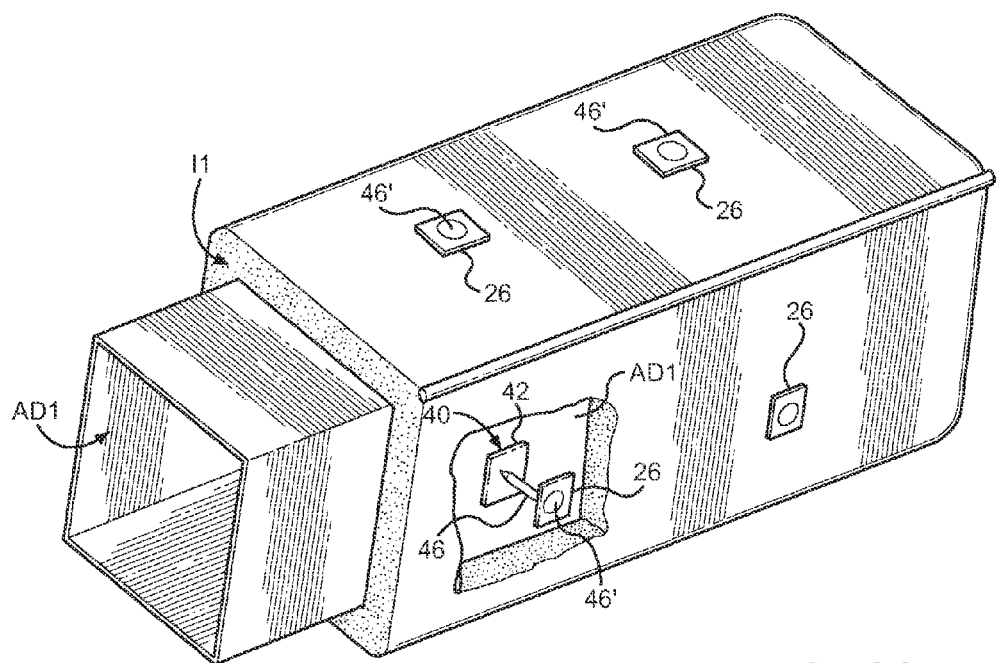
FIG. 16 is an illustrational view of the hangers of the invention used to mount an insulation blanket to an HVAC air duct.
Figure 17:
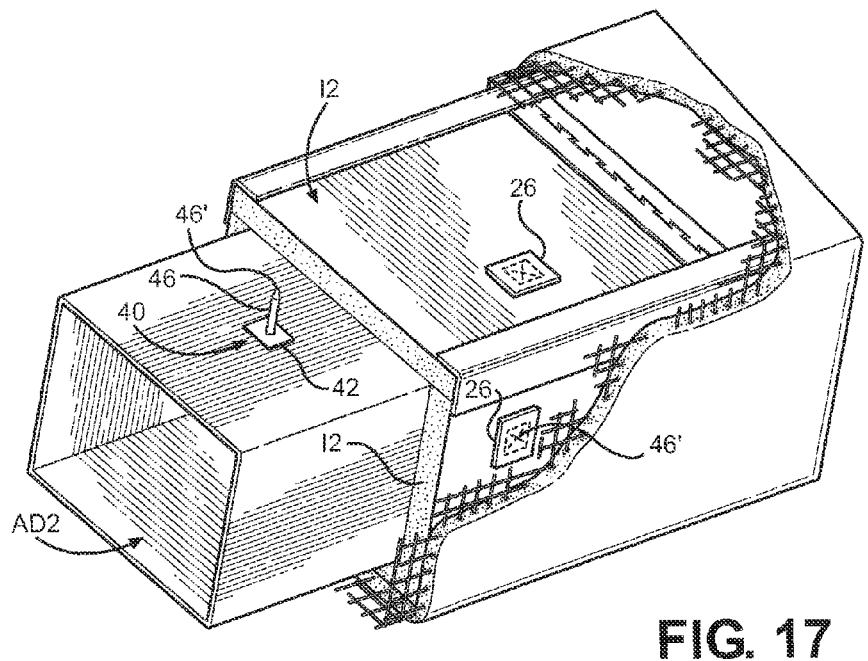
FIG. 17 is another illustrational view of the hangers of the invention used to mount insulation panels to an HVAC air duct.

With reference to FIGS. 16 and 17, two types of insulation materials are shown as being attached to HVAC ducts "AD1" and "AD2". In FIG. 16, a flexible pad of insulation "I1" is shown as being wrapped about the duct "AD1" and connected to the duct by being impaled over the shanks 46 of four spaced hangers 40 which have been adhered to the duct "AD1" as previously described. After the insulation pad is impaled, locking clips, such as shown in FIG. 3, are forced over the exposed tips 46' of the shanks and thereby prevent removal of the insulation material from the duct "AD1". The number and spacing of the hangers will vary from one application to another. In some instances, an insulation material may be completely wrapped about an article such as duct "AD1" and secured using a single line of hangers over which opposite ends of the insulation material are impaled. In other applications, multiple rows or varying patterns of hangers may be necessary to secure an insulation material to a surface.

With reference to FIG. 17, the air duct "AD2" is covered with four separate panels "I2" of insulation. The panels are more rigid than the flexible pad insulation. The panels are impaled over shanks 46 of hangers 40 adhered to the duct "AD2" as previously described after which the locking clips 26 are forced over the tips 46' of the shanks of the hangers.

It should be noted that although FIGS. 16 and 17 show insulation being applied to the outer surfaces of the ducts, there are many applications where the insulation is applied to interior surfaces of ducts, furnaces and other structures.

As previously described, conventional insulation hangers are packaged in such a manner that the sharply tipped shanks of the hangers can penetrate the walls of boxes in which such hangers are shipped. This often results in injury to individuals handling the boxes. In addition, as the hangers are normally randomly placed in cardboard boxes for shipment, it is easy to accidentally injury ones hand when reaching into a box to remove one or more hangers. With particular reference to FIGS. 7-15, one of the benefits of the present invention is the manner in which the strips 45 of hangers 40 may be assembled with one another in an ordered manner and thereafter placed in shipping boxes in stacks to thereby prevent the shanks from penetrating the walls of the boxes or containers during storage and shipping.

Figure 7:
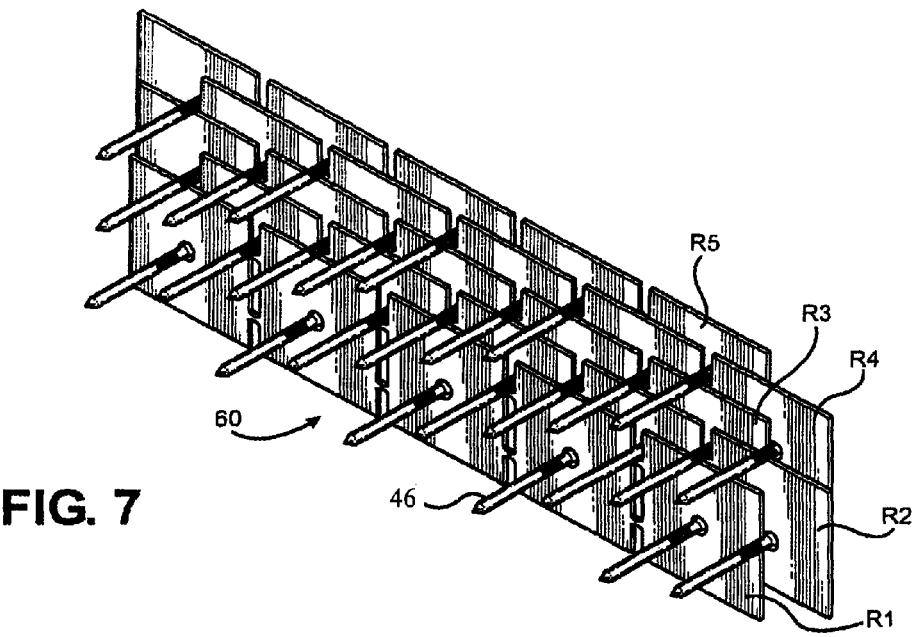
FIG. 7 is a top perspective view of a plurality of strips of hangers as shown in FIG. 4 assembled in front to back relationship with one another with the shanks extending in the same direction and with every other strip being laterally offset such that the shanks of every other strip, after the top or first strip, seat within open slots formed between the integrally formed bases of the hangers of the strip in front of it in an assembly of strips.
Figure 8:
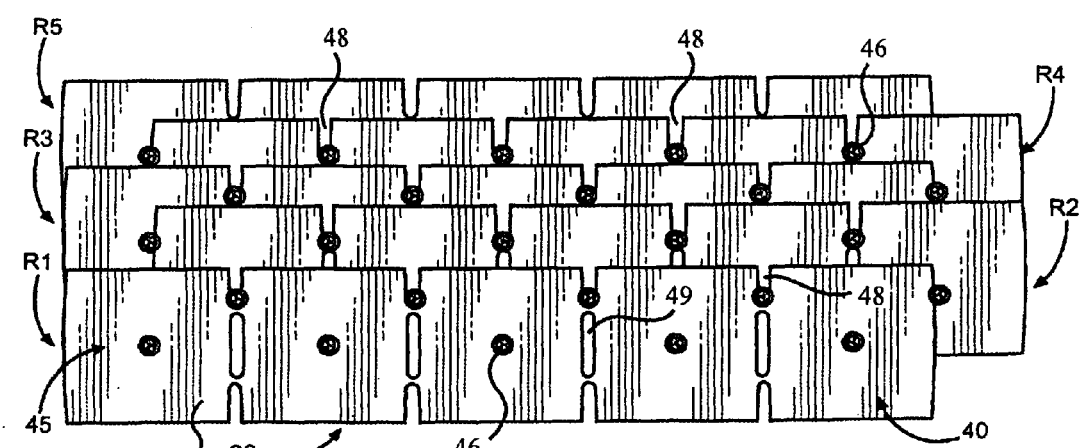
FIG. 8 is a top plan view of the assembly of strips of FIG. 7.
Figure 9:
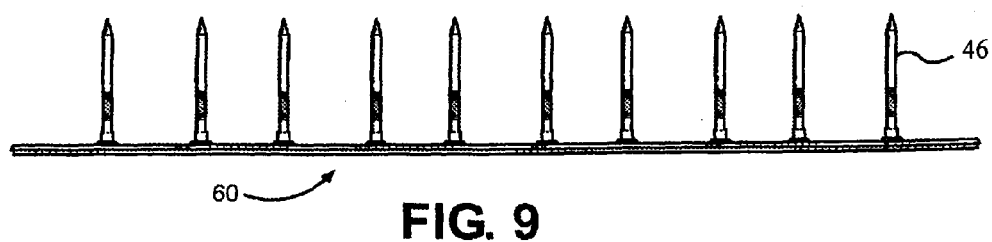
FIG. 9 is a side view of the assembly of FIG. 7.

As shown in FIGS. 7-9, a plurality of strips 45 of hangers 40 are oriented such that the shanks 46 thereof extend in the same direction and generally parallel to one another. The strips are subsequently arranged in back to front relationship in closely spaced rows, R1-R5, with the strips being engaged with one another and with every even number row being offset slightly laterally and with each row being vertically offset as shown. In this manner the shanks of the hangers 40 of the second row R2 of strips 45 rest within the open slots 48 along one edge of the first row R1 of strips 45 while the shanks of the third row R3 of strips seat against the middle edge portion of the first row R1 of strips and within the open slots 48 of the second row of strips R2. The shanks of the forth row R4 of strips rest within the open slots 48 of the third row R3 of strips and on the upper middle edges of the first and second rows R1 and R2 of strips. In like manner, the shanks of the fifth row R5 of strips rest within the open slots 48 of the forth row of strips and on the middle upper edge of all the other rows of strips R1-R3. As the sheet metal forming the bases 42 is a relative thin gauge material, the tips 46' of the shanks are closely aligned with one another when arranged in the fitted assembly of strips 60.

Figure 10:
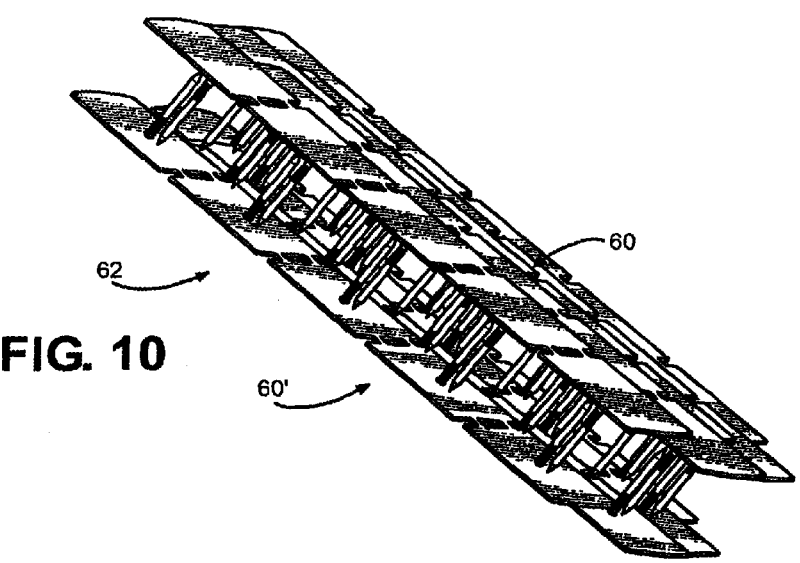
FIG. 10 is perspective view of a stack of opposing strip assemblies as shown in FIG. 7 with the strip assemblies mounted in opposing relationship with one another such that the shanks of one assembly are opposed by the bases of the opposing strip assembly.
Figure 11:
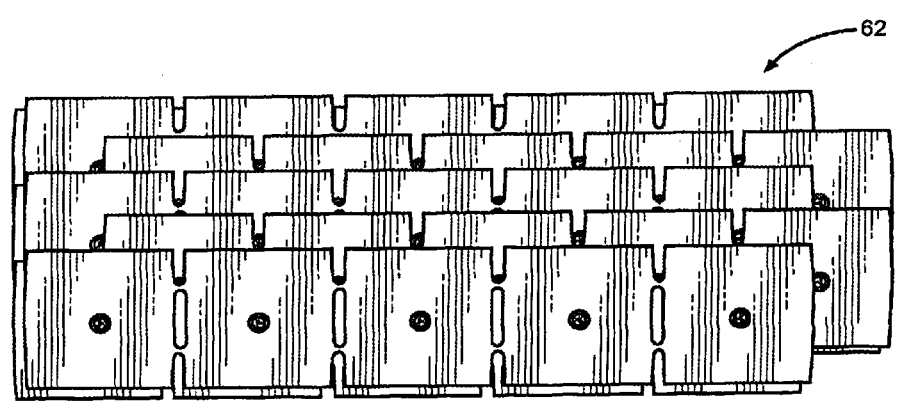
FIG. 11 is a top plan view of the stack of strip hangers of FIG. 10.
Figure 12:
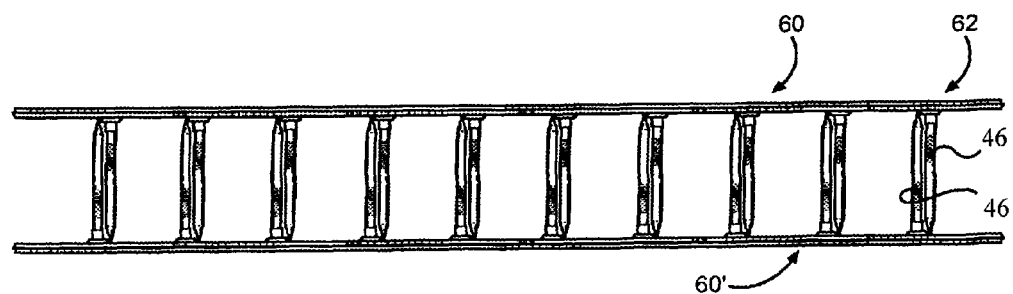
FIG. 12 is a side view of the stack of strip hangers shown in FIG. 10.

With reference to FIGS. 10-12, two assemblies 60 and 60' of strips are shown as being oriented in opposing relationship with one another to form a stack of strips 62 wherein the shanks 46 of the assembly 60 are oriented toward the bases 42 of the assembly 60' while the shanks 46 of the assembly 60' are oriented toward the bases 42 of the assembly 60. In this manner, the bases of the hangers 40 function to shield the tips of the shanks from being accidentally contacted and thus prevent personal injury. For shipping, a single stack 62 of strips may be placed within a corrugated box or shipping container so that the shanks can not penetrate the walls of the container.

Figure 13:
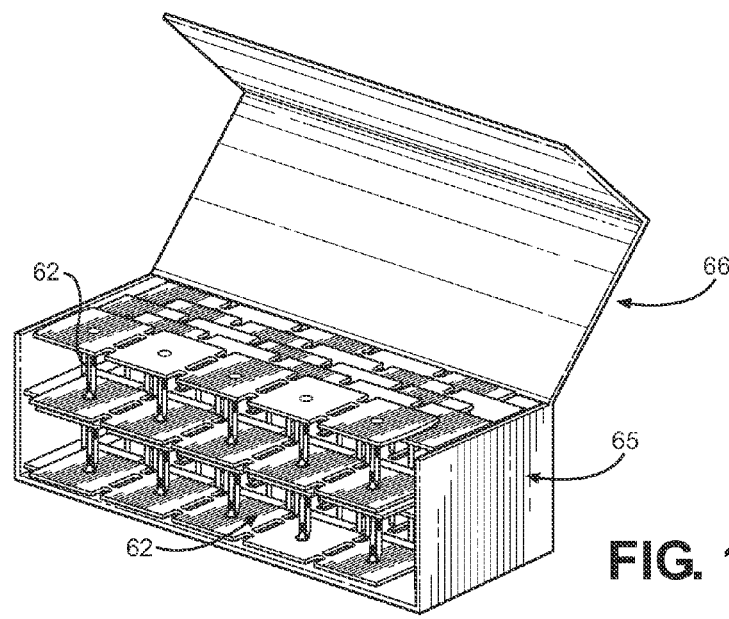
FIG. 13 is an illustration perspective view of two stacks of strip hangers shown in FIG. 10 stored in a shipping or distribution box or container.
Figure 14:
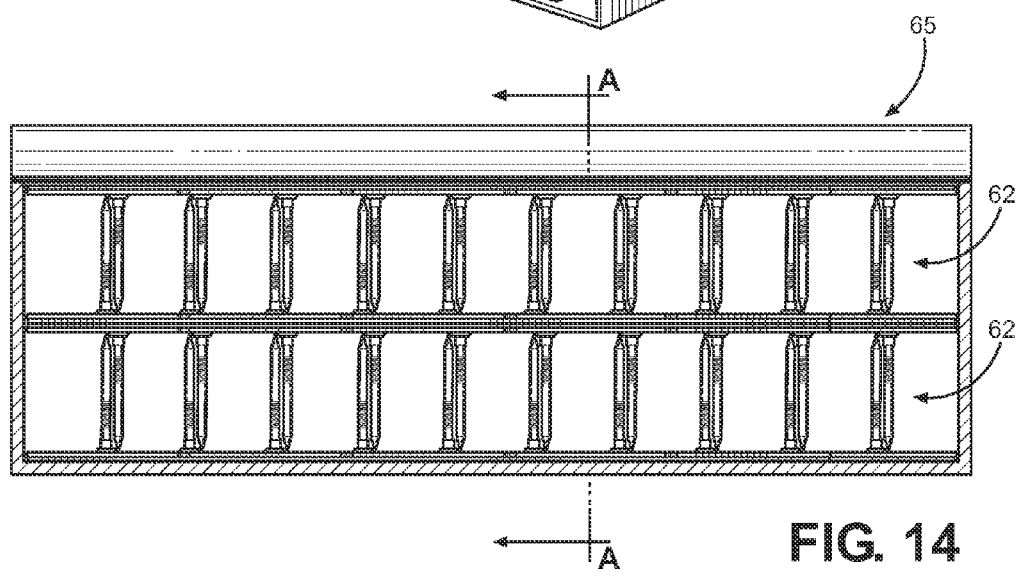
FIG. 14 is a front elevation of the package of FIG. 13.
Figure 15:
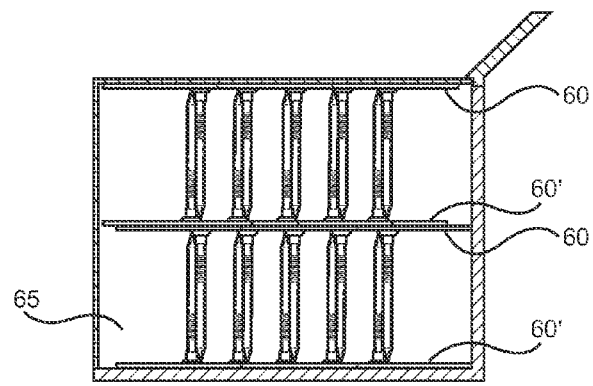
FIG. 15 is a cross section taken along line A-A of FIG. 14.

With reference to FIGS. 13-15, two stacks 62 of the assemblies 60 of strips 45 are shown as being seated within a corrugated cardboard box or container 65 having a lid 66. As the tips of the shanks of the hangers are covered by the opposing bases of the opposing strips of hangers, the sharp tips can not penetrate the container. Further, due to the orderly arrangement of the strips within the container, the strips 45 may be easily removed from the container without accidental injury. It should be noted the any number of stacks 62 of assemblies 60 of the strips 45 may be placed within a shipping container.

Figure 18:
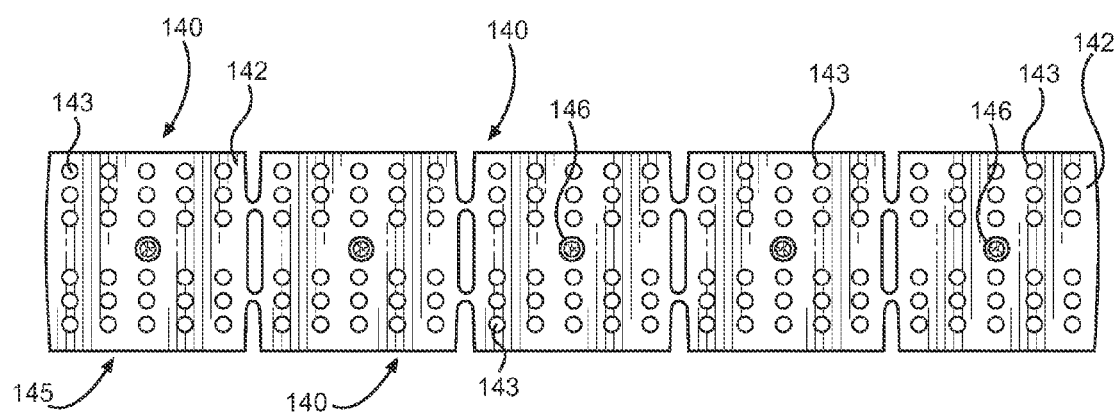
FIG. 18 is a variation of the base structure for strips of integrally formed hangers in accordance with the invention.

With reference to FIG. 18, a modification of the heads of the hangers formed in strips 145 is shown. In this embodiment, the bases 142 of the hangers 140 include a plurality of holes 143 therein for purposes of allowing an adhesive to flow through the holes when the hangers are in use, in the same manner as the conventional hangers 20A. The holes 143 are provided in areas of the bases such that the holes will not align with shanks extending from opposing bases of opposing strips of hangers are arranged in assemblies such as 60,60' so that the bases 142 will be effective to shield the tips of the shanks 146 from walls of a container in which the strips of hangers are packaged and shipped. In this embodiment, the peel and stick adhesive materials are not used. The remaining portions, such as the open slots formed in the strips 145 are the same as in the preferred embodiment.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. Hanger strips for securing insulation material to a surface of a structure, the hangers comprising a strip of sheet metal material including a plurality of bases which are connected in series by at least one breakable tab integrally formed between each pair of adjacent bases and wherein oppositely oriented first open slots extend from each of the at least one breakable tabs toward opposite side edges of the bases, a shank extending from each of the bases and the shanks being oriented in a common direction, and wherein said oppositely oriented first open slots have a width greater than the diameter of said shanks and a sufficient depth to receive and maintain in said slots a shank of another hanger, whereby connected bases with shanks form a plurality of hangers that may be separated for use by breaking the breakable tabs between the adjacent bases.

2. The hanger strips of claim 1 including a peel and stick adhesive material applied to the bases on a surface thereof opposite the shanks.

3. The hanger strips of claim 1 wherein each base has a plurality of holes therein.

4. The hanger strips of claim 1 wherein at least two spaced tabs are integrally formed between each adjacent pair of bases, and the first open slots being formed between the tabs and the opposite side edges of the bases.

5. The hanger strips of claim 4 including at least one second open slot between the at least two spaced tabs.

6. A method of assembling insulation type hanger strips of claim 1 to facilitate the handling and shipping of the hangers, the method comprising the steps of:
    A. Forming a first assembly of a plurality of rows of strips having the bases thereof in engagement and having their shanks extending in a first direction and forming a second assembly of a plurality of rows of strips having the bases thereof in engagement and having their shanks extending in a second direction opposite the first direction; and
    B. Orienting the first and second assemblies of strips in opposing relationship with one another such that the oppositely oriented shanks are shielded between the bases of the opposing first and second assemblies to form at least one safety stack of strips of hangers wherein tips of the shanks do not extend outwardly beyond the opposing bases of the opposing assembly of strips.

7. The method of assembling insulation hanger strips of claim 6 including the additional steps of:
    C. Forming each of the first and second assemblies of a plurality of strips such that the shanks of each of the plurality of rows after a first row are seated within one of the first open slots defined between each of the bases or is aligned adjacent an end of an immediately adjacent strip such that the bases of each of the plurality of rows of strips are compactly seated relative to one another to thereby form an imperforate barrier to prevent passage of tips of opposing shanks from penetrating between the bases of the opposing assembly of strips when the first and second assemblies are stacked relative to one another.

8. The method of claim 7 including the additional step of:
    D. Enclosing the at least one safety stack of strips within an enclosure.

9. The method of claim 7 including the additional step of stacking a plurality of safety stacks one upon another and placing the stacked safety stacks within an enclosure.

10. A plurality of hanger strips for securing insulation material to a surface of a structure, each of said hanger strips comprising a strip of sheet metal material including a plurality of bases which are connected in series by at least one breakable tab integrally formed between each pair of adjacent bases and wherein oppositely oriented first open slots extend from each of the at least one breakable tabs toward opposite side edges of the bases, a shank extending from each of the bases and the shanks being oriented in a common direction, and wherein said oppositely oriented first open slots have a width greater than the diameter of said shanks and a sufficient depth to receive and maintain in said slots a shank of another hanger, whereby connected bases with shanks form a plurality of hangers that may be separated for use by breaking the breakable tabs between the adjacent bases.

11. The plurality of hanger strips of claim 10 wherein each of said strips further includes at least two spaced tabs that are integrally formed between each adjacent pair of bases, and the first open slots being formed between the tabs and the opposite side edges of the bases.

12. The plurality of hanger strips of claim 11 wherein each of said strips further includes at least one second open slot between the at least two spaced tabs.

13. The plurality of hanger strips of claim 12 wherein each of said hanger strips includes a peel and stick adhesive material applied to the bases on a surface thereof opposite the shanks.

14. The plurality of hanger strips of claim 10 wherein each base of said plurality of strips has a plurality of holes therein.

15. The plurality of hanger strips of claim 10 wherein each of said hanger strips are nested such that said shanks oriented in the same direction are slidably stacked to one another in a front to rear manner with the shanks of the plurality of strips seated within the first open slots of the other strips and stacked relative to one another.

16. The plurality of hanger strips of claim 15 comprising 4 to 6 strips.

17. The plurality of hanger strips of claim 15 further including a second plurality of said hanger strips facing the opposite direction such that the ends of said shanks of the first plurality of hanger strips engage the bases of the second plurality of hanger strips.

18. The plurality of hanger strips of claim 16 where said first and second plurality of hanger strips are in an enclosure.

\* \* \* \* \*